United States Patent
Tabuchi

(10) Patent No.: US 9,306,858 B2
(45) Date of Patent: Apr. 5, 2016

(54) NETWORK APPARATUS, COMMUNICATION SYSTEM, ABNORMAL TRAFFIC DETECTION METHOD, AND PROGRAM

(75) Inventor: Koji Tabuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/114,194

(22) PCT Filed: Apr. 27, 2012

(86) PCT No.: PCT/JP2012/061338
§ 371 (c)(1),
(2), (4) Date: Oct. 25, 2013

(87) PCT Pub. No.: WO2012/147909
PCT Pub. Date: Nov. 1, 2012

(65) Prior Publication Data
US 2014/0043965 A1   Feb. 13, 2014

(30) Foreign Application Priority Data
Apr. 27, 2011 (JP) .................................. 2011-099223

(51) Int. Cl.
*H04L 1/00* (2006.01)
*H04L 12/813* (2013.01)
(Continued)

(52) U.S. Cl.
CPC .............. *H04L 47/20* (2013.01); *H04L 43/062* (2013.01); *H04L 47/11* (2013.01)

(58) Field of Classification Search
CPC ....... H04L 47/11; H04L 47/20; H04L 43/062; H04L 12/26

USPC .......................................................... 370/229
See application file for complete search history.

(56) References Cited

U.S. PATENT DOCUMENTS 6,647,424 B1 * 11/2003 Pearson et al. ................ 709/232
2007/0291643 A1   12/2007 Charny et al.
(Continued)

FOREIGN PATENT DOCUMENTS

EP   2 237 496 A1   10/2010
JP   8-186572         7/1996
(Continued)

OTHER PUBLICATIONS

Extended European Search Report dated Nov. 14, 2014, issued by the European Patent Office in counterpart European Patent Application No. 12777668.0.
(Continued)

*Primary Examiner* — Sai-Ming Chan
(74) *Attorney, Agent, or Firm* — Finnegan, Henderson, Farabow, Garrett & Dunnner LLP

(57) ABSTRACT

A network apparatus includes a memory and one or more processors. The memory stores instructions. The one or more processors are configured to execute the instructions to mark traffic that exceeds a rate limit. The one or more processors are also configured to execute the instructions to measure an amount of the marked traffic by using one or more filters to detect information written in a data packet by the one or more processors. The one or more processors are further configured to execute the instructions to output the measured traffic amount in a period determined based on an expected time duration of abnormal traffic. The abnormal traffic is a detection target of the network apparatus.

18 Claims, 6 Drawing Sheets

(51) Int. Cl.
*H04L 12/801* (2013.01)
*H04L 12/26* (2006.01)

(56) References Cited

U.S. PATENT DOCUMENTS

2009/0040929 A1   2/2009   Lee et al.
2011/0264821 A1*  10/2011  Van Leekwijck et al. .... 709/235
2012/0033553 A1   2/2012   Strulo et al.

FOREIGN PATENT DOCUMENTS

| JP | 8-223174 | 8/1996 |
| JP | 2005-102104 | 4/2005 |
| JP | 2005-117392 | 4/2005 |
| JP | 2009-206896 | 9/2009 |
| JP | 2010-213048 | 9/2010 |
| WO | WO 2007/145845 A2 | 12/2007 |

OTHER PUBLICATIONS

G. Karagiannis, "Requirements for Signaling of (Pre-) Congestion Information in a DiffServ Domain, draft-letf-pcn-signalling-requirements-00," Jul. 5, 2010.

International Search Report and Written Opinion mailed May 29 and May 17, 2012.

Office Action issued by the Japanese Patent Office in counterpart Japanese Patent Application No. 2014-264308, dated Oct. 2, 2015.

\* cited by examiner

NETWORK APPARATUS, COMMUNICATION SYSTEM, ABNORMAL TRAFFIC DETECTION METHOD, AND PROGRAM

CROSS-REFERENCE TO RELATED PATENT APPLICATIONS

This application is a National Stage Entry of International Application No. PCT/JP2012/061338, filed Apr. 27, 2012, which is based upon and claims the benefit of the priority from Japanese patent application No. 2011-099223, filed on Apr. 27, 2011. The entire contents of the above-referenced applications are expressly incorporated herein by reference.

TECHNICAL FIELD

The present invention relates to a network apparatus, a communication system, an abnormal traffic detection method, and a program. In particular, it relates to a network apparatus, a communication system, an abnormal traffic detection method, and a program capable of detecting abnormal traffic caused within a relatively short time.

BACKGROUND

While not directly related to the present invention, PTL 1 and 2 have been detected by prior art search. PTL 1 discloses a congestion monitoring system that monitors a congestion state about data transmission among a plurality of devices. At least one of the devices includes a back pressure information generation means generating back pressure information for instructing an preceding device to stop or continue data transmission based on a result of comparison between the amount of unprocessed data retained and a predetermined threshold. A device, located upstream of the device including the back pressure information generation means includes: a data transmission stopping means that stops data transmission based on content of the back pressure information; a monitoring means that monitors change in the back pressure information transmitted from the corresponding back pressure information generation means to the data transmission stopping means along with a lapse of time; and an index calculating means that calculates an index indicating a back pressure occurrence frequency based on information obtained by monitoring by the corresponding monitoring means. With the congestion monitoring system, an index that indicates urgency about the congestion state can be calculated in real time.

PTL 2 discloses a configuration including: an external RAM token counter holding token values obtained by adding token values of meter IDs of a plurality of users; and first and second information caches extracting a meter ID and length information about each packet data and storing packet information including a coincidence flag representing the sameness among meter IDs and lengths of a predetermined number of packets and a predetermined number of meter IDs. A timing generation unit is used for a switch operation so that one of the first and second information caches receives packet information and the other information cache performs token calculation with a token calculation unit on each meter ID. This configuration also includes first and second information buffers in which a flag representing passage/discard of packet data is set as a calculation result.

PATENT LITERATURE (PTL)

[PTL 1]
Japanese Patent Kokai Publication No. 2005-117392A
[PTL 2]
Japanese Patent Kokai Publication No. 2009-206896A

SUMMARY

The following analysis has been given by the present inventor. In recent years, a virtual server environment has been increasingly used in the use of computers. Accordingly, there are many hosting services using virtual server environment. In such a service, in many cases, virtual servers of a plurality of different subscribers are operated on a single physical server. However, if traffic in a virtual server of a certain subscriber causes a micro-bursting, an operation of a server of another subscriber may be affected. Namely, such microburst may be handled as failure of the virtual server hosting service.

FIG. 6 illustrates a configuration including n physical servers, each of which includes virtual servers, which can be accessed by k terminals. With the configuration as illustrated in FIG. 6, a possible operation is to perform a monitoring operation by using a function (packet counter) for determining the number or the length of packets, the function being implemented in an ingress processing unit (see 10 in FIG. 3) and an egress processing unit (see 50 in FIG. 3) included in a network apparatus 100.

More specifically, this type of network apparatus 100 includes a function of storing the sum of discarded packets or packet lengths as a counter value if the upper limit of the bandwidth of an interface port is reached. This counter value is regularly checked. When the difference between a traffic amount and the counter value is compared, if the traffic amount is determined to be higher than a preset level, the traffic is determined to be congested. In addition, in such case, the monitoring period is generally set to be a few seconds to a few minutes.

However, in this regular monitoring method, all traffic is monitored, and the monitoring period cannot be shortened in view of monitoring processing load. Thus, a traffic amount within the above monitoring period of a few seconds to a few minutes is observed. As a result, if a congestion is caused within a short time such as within a few ms to few dozens of ms as typified by a micro-bursting and if the traffic amount does not reach a predetermined notification level in the above period, such convergent congestion cannot be detected as a congestion state, counted as a problem.

It is an object of the present invention to provide a network apparatus, a communication system, an abnormal traffic detection method, and a program capable of detecting abnormal traffic as a detection target, without increasing load.

According to a first aspect, there is provided a network apparatus, comprising: a marking unit marking traffic that exceeds a predetermined rate limit; a measuring unit measuring an amount of the marked traffic; and a monitoring unit outputting the measured traffic amount in a period determined based on an expected duration time of abnormal traffic as a detection target.

According to a second aspect, there is provided a communication system, comprising: a first network apparatus; and a second network apparatus; wherein the first network apparatus comprises a marking unit marking traffic that exceeds a predetermined rate limit; and wherein the second network apparatus comprises: a measuring unit measuring an amount of the marked traffic; and a monitoring unit outputting the measured traffic amount in a period determined based on an expected duration time of abnormal traffic as a detection target.

According to a third aspect, there is provided an abnormal traffic detection method, comprising steps of: marking traffic that exceeds a predetermined rate limit; regularly measuring an amount of the marked traffic; and outputting the measured traffic amount in a period determined based on an expected duration time of abnormal traffic as a detection target. This method is associated with certain machines, namely, with a network apparatus performing the marking and measuring and with a monitoring apparatus.

According to a fourth aspect, there is provided a program causing a computer included in a network apparatus to execute processing of: marking traffic that exceeds a predetermined rate limit; regularly measuring an amount of the marked traffic; and outputting the measured traffic amount in a period determined based on an expected duration time of abnormal traffic as a detection target. This program can be recorded in a computer-readable storage medium. Namely, the present invention can be embodied as a computer program product.

The meritorious effects of the present disclosure are summarized as follows. According to the present disclosure, it is possible to detect abnormal traffic as a detection target, without increasing load.

PREFERRED MODES

Figure 1:
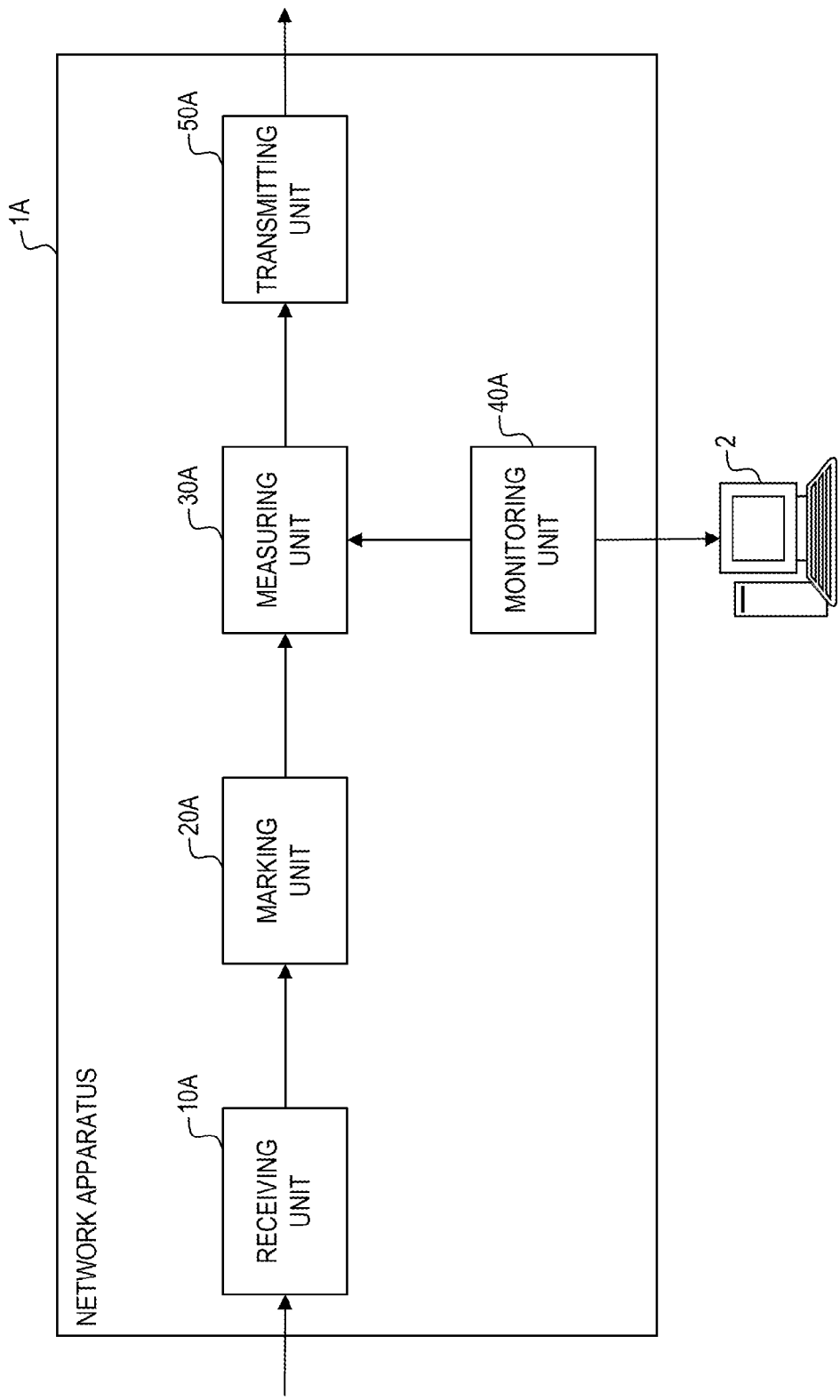
FIG. 1 illustrates an outline of the present invention.

First, an outline of an exemplary embodiment of the present invention will be described. In the following outline, various components are denoted by reference characters for the sake of convenience. Namely, the following reference characters are merely used as examples to facilitate understanding of the present invention. Thus, the present invention is not limited to the illustrated modes.

As illustrated in FIG. 1, an exemplary embodiment of the present invention can be realized by a network apparatus including a receiving unit 10A, a transmitting unit 50A, a marking unit 20A marking traffic that exceeds a predetermined rate limit, a measuring unit 30A regularly measuring an amount of the marked traffic, and a monitoring unit 40A providing a function of monitoring the measured traffic amount.

Figure 2:
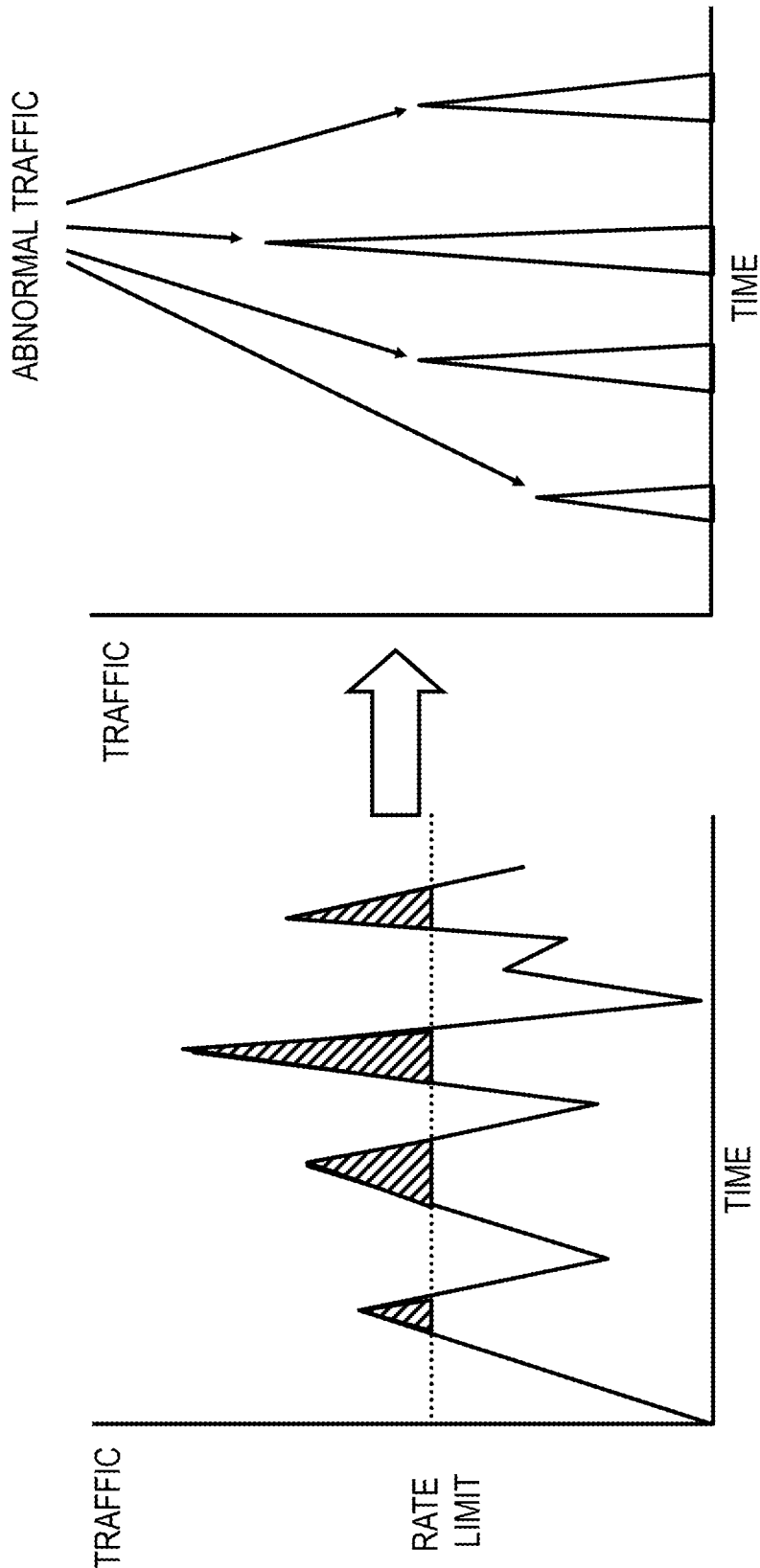
FIG. 2 illustrates an outline of the present invention.

More specifically, the marking unit 20A marks traffic that exceeds a predetermined rate limit, as illustrated in shaded areas in the left-side graph in FIG. 2. In addition, the measuring unit 30A regularly measures an amount of the marked traffic. As illustrated in the right-side graph in FIG. 2, the monitoring unit 40A outputs a traffic amount in a period determined based on an expected duration time of abnormal traffic as a detection target to a predetermined monitoring apparatus 2.

For example, if the abnormal traffic as a detection target is a micro-bursting, for example, a traffic amount in a period determined based on an expected duration time such as a few dozens of ms is marked and visualized. In this way, occurrence of a micro-bursting can be detected or a micro-bursting can be predicted. A micro-bursting refers to convergent traffic that cannot be detected by a monitoring period of a few seconds to a few minutes.

First Exemplary Embodiment

Figure 3:
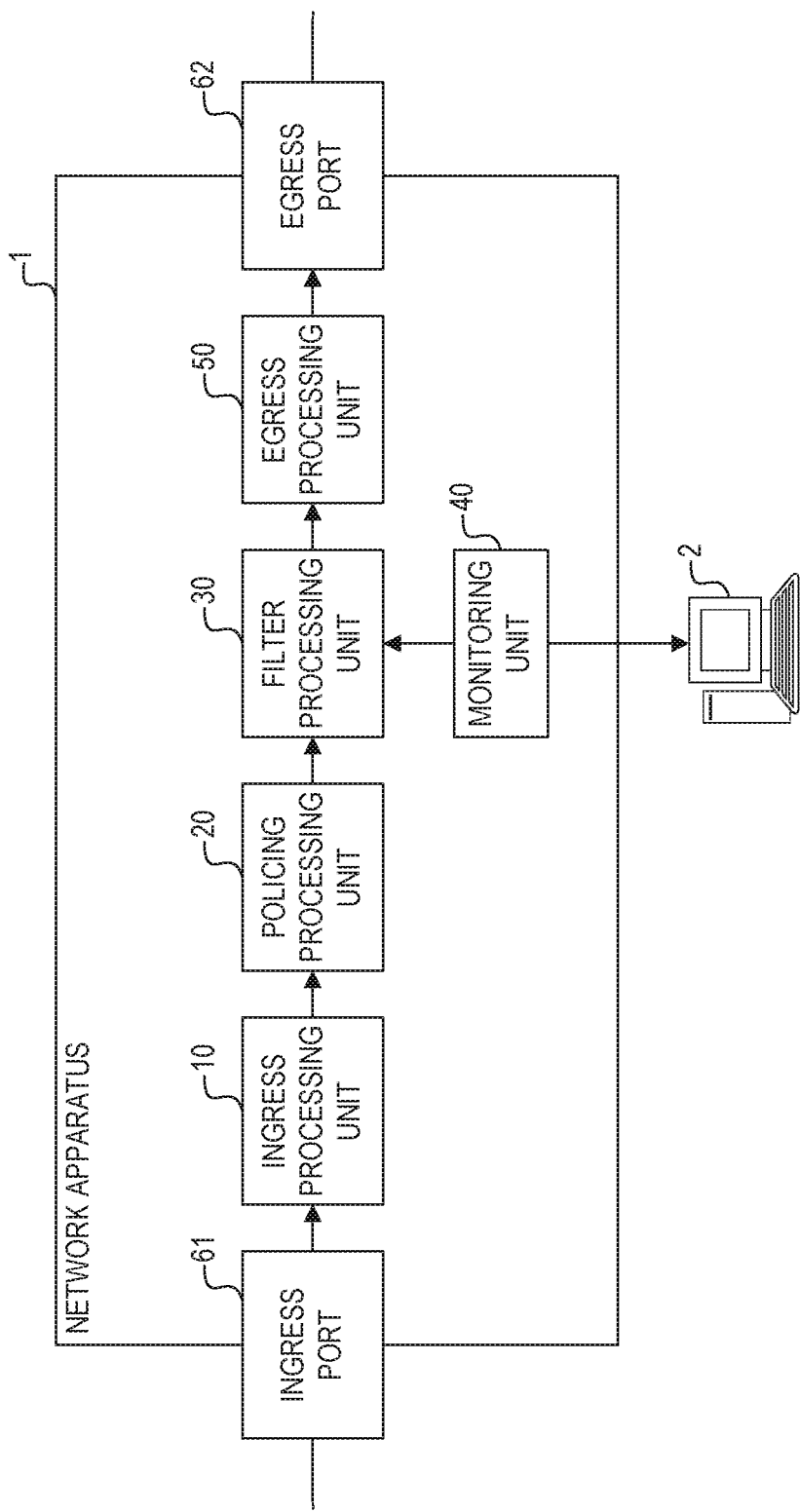
FIG. 3 is a block diagram illustrating a configuration of a network apparatus according to a first exemplary embodiment of the present invention.

Next, a first exemplary embodiment of the present invention will be described in detail with reference to the drawings. FIG. 3 is a block diagram illustrating a configuration of a network apparatus according to the first exemplary embodiment of the present invention. FIG. 3 illustrates a network apparatus 1 including an ingress port 61, an ingress processing unit 10, a policing processing unit 20, a filter processing unit 30, a monitoring unit 40, an egress processing unit 50, and an egress port 62.

The ingress port 61 receives packets from external nodes. For example, the "external nodes" may be terminals and other communication apparatuses, such as servers transmitting packets.

After performing predetermined ingress processing on packets received via the ingress port 61, the ingress processing unit 10 outputs the processed packets to the policing processing unit 20. The predetermined ingress processing is equivalent to that performed by an ingress processing unit included in a general network apparatus. For example, if the network apparatus 1 is an Ethernet (registered mark) switch, MAC address learning, packet counting processing associated with packet transmission, reception, or discard, or the like is performed.

After performing marking (coloring) processing on packets inputted from the ingress processing unit 10, the policing processing unit 20 outputs the processed packets to the filter processing unit 30. The policing processing unit 20 according to the present exemplary embodiment monitors the packet processing rate, by using a Leaky Bucket algorithm. If a predetermined rate limit is exceeded, the policing processing unit 20 marks packets that are being processed at that timing. The predetermined rate limit can arbitrarily be set. For example, assuming that 500 Mbps is set as the rate limit in a line in which the data rate is 1 Gbps, if the policing processing unit 20 receives a packet and the data rate exceeds 500 Mbps, the policing processing unit 20 marks the packet.

This marking processing can be realized by setting a priority-designation CoS (Class of Service) value in a VLAN tag (IEEE802.1q) to an arbitrary certain value.

Figure 6:
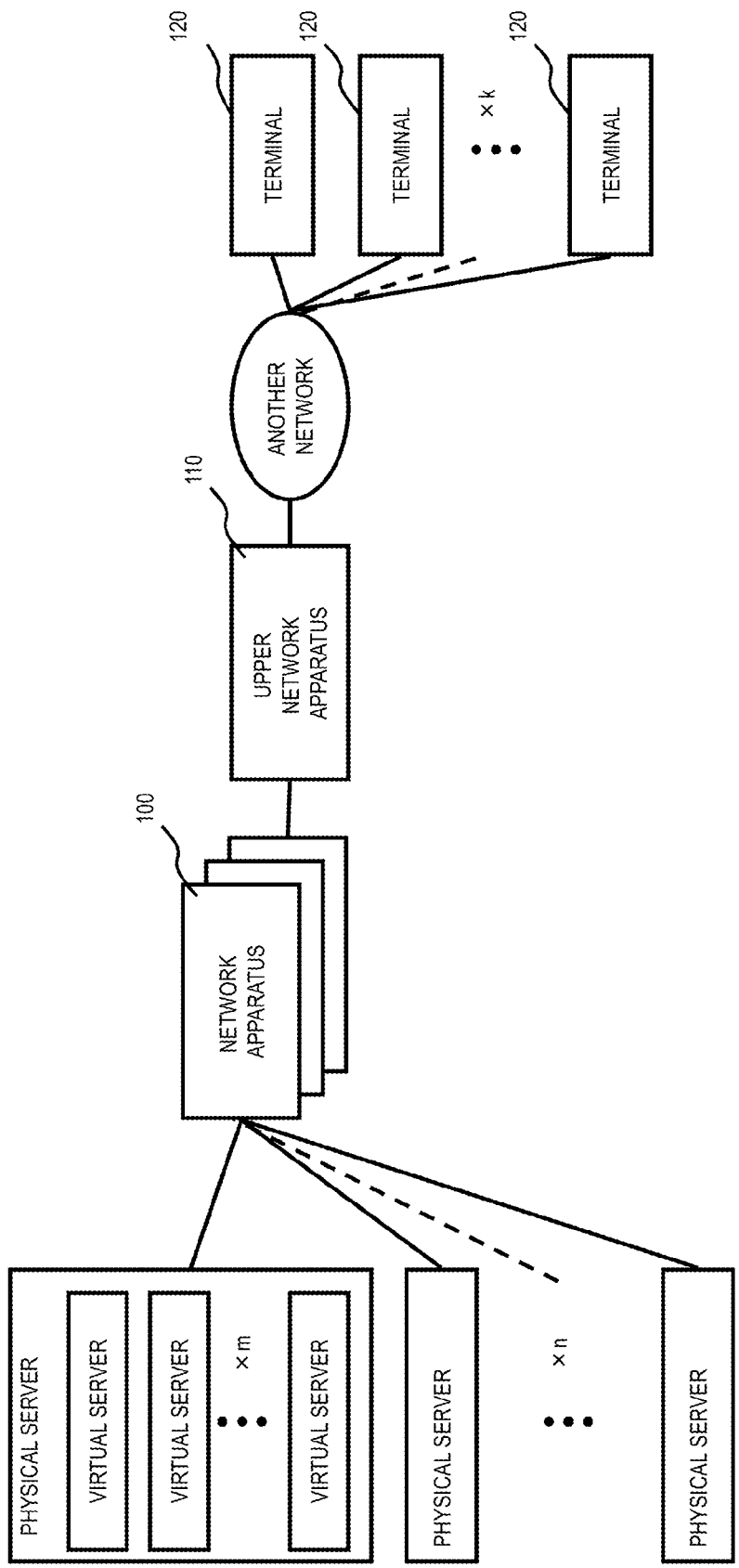
FIG. 6 illustrates a connection example of network apparatuses according to the present invention.

For example, in the virtual server environment as illustrated in FIG. 6, since a VLAN tag for identifying a virtual server is used, a VLAN tag (IEEE802.1q) is set in each packet received from the outside. In a VLAN tag, a CoS value representing priority of a packet can be set. The present description will be made assuming that an arbitrary fixed value such as "0" has been set by an external node. In such case, in the marking processing, the CoS value is set to an arbitrary value other than the above fixed value. For example, the CoS value is set to "1."

The filter processing unit 30 determines the sum of the packets or the sum of the lengths of the packets on which the marking processing has been performed by the policing processing unit 20. In addition, it is desirable that the filter processing unit 30 perform processing for converting each marked packet to its initial state after determining the sum. For example, if the marking processing has been performed and the above CoS value has been changed from "0" to "1,"

the filter processing unit 30 performs processing for converting the CoS value to the initial fixed value "0."

In addition, the filter processing unit 30 forwards marked packets and unmarked packets to the egress processing unit 50.

After performing predetermined egress processing, the egress processing unit 50 transmits the received packets via the egress port 62. The predetermined egress processing is equivalent to that performed by an egress processing unit included in a general network apparatus. For example, if the network apparatus 1 is an Ethernet (registered mark) switch, the egress processing unit 50 refers to a MAC address learning table, determines an egress port of the destination, and outputs the packet to the egress port.

The monitoring unit 40 reads a counter value of the filter processing unit 30 in a period determined to detect a micro-bursting. The monitoring unit 40 stores a counter value previously read. If the difference from the previous value exceeds a predetermined threshold (see the right-side graph in FIG. 2), the monitoring unit 40 determines occurrence of a micro-bursting and notifies a monitoring apparatus 2 or an operator monitoring the entire network including this network apparatus 1 of the occurrence of a micro-bursting.

The predetermined threshold can be set arbitrarily, in view of a network operation target. For example, when the predetermined threshold is set to 1, if the difference from the previous value of the counter in the filter processing unit 30 is 1 or more, the monitoring unit 40 gives a notification. In this way, occurrence of a micro-bursting can be detected and a notification of such occurrence can be given, without fail. A different value other than 1 can be set as the predetermined threshold.

Figure 4:
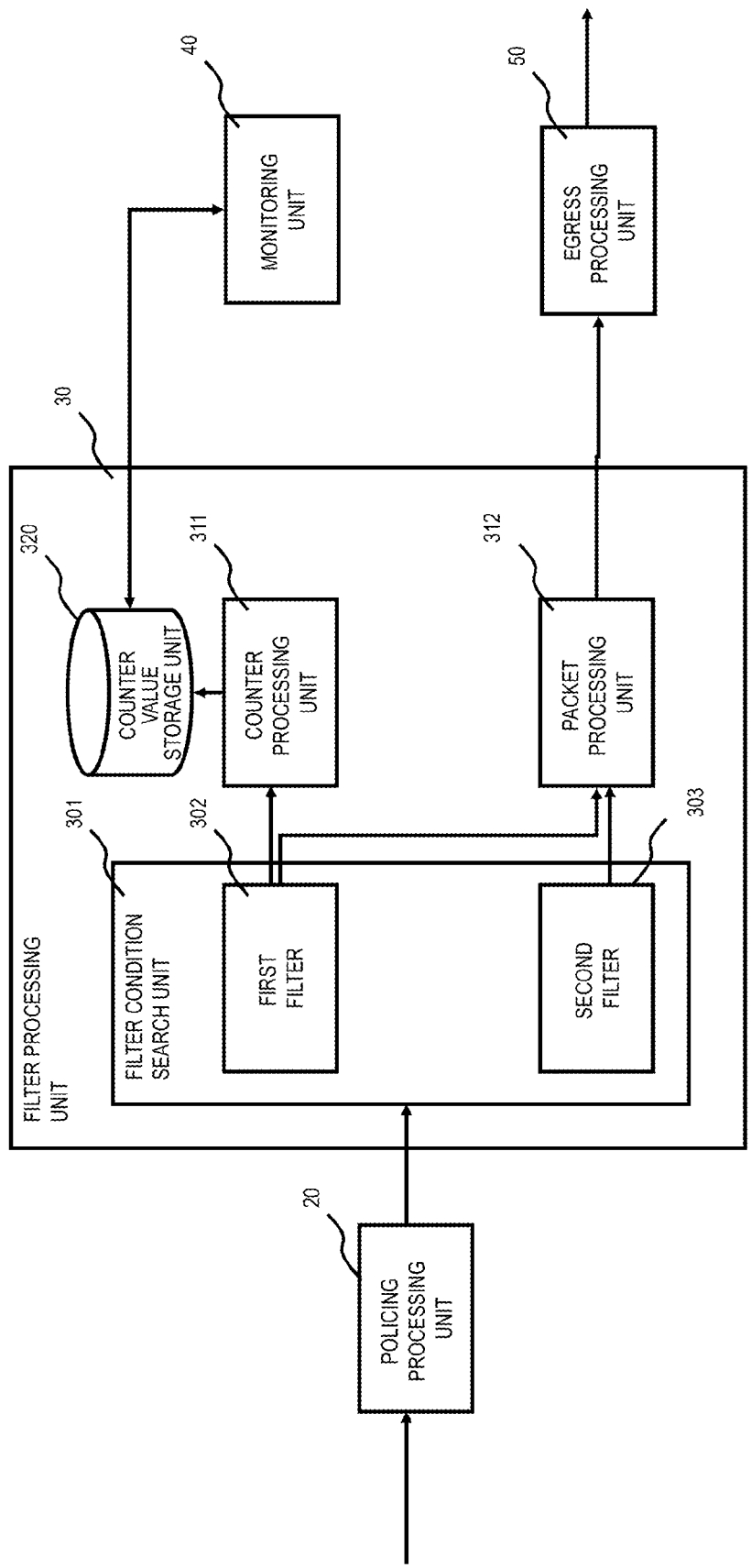
FIG. 4 is a block diagram illustrating a detailed configuration of a filter processing unit of the network apparatus according to the first exemplary embodiment of the present invention.

Next, a detailed configuration of the filter processing unit 30 of the network apparatus 1 will be described. FIG. 4 is a block diagram illustrating a detailed configuration of the filter processing unit of the network apparatus according to the first exemplary embodiment of the present invention.

FIG. 4 illustrates a configuration including a filter condition search unit 301, a counter processing unit 311, a packet processing unit 312, and a counter value storage unit 320.

A first filter 302 in which conditions matching marked packets are defined and a second filter 303 in which conditions matching all packets including the marked packets are defined are set in the filter condition search unit 301. If a received packet matches the first filter 302, the filter condition search unit 301 instructs the counter processing unit 311 to increase a counter value stored in the counter value storage unit 320 by a value based on the packet. For example, if the CoS value in the VLAN tag has been rewritten by the marking processing, a matching condition for extracting packets whose CoS value has been rewritten ("1" in the case of the above example) is set in the first filter 302.

A counter having a function of determining the number of packets and/or a function of determining the sum of packet lengths can be used as the counter processing unit 311.

After converting the marked portion of the packet matching the first filter 302 into its initial state, the packet processing unit 312 outputs the packet to the egress processing unit 50. The packet processing unit 312 also outputs the packet matching the second filter 303 to the egress processing unit 50.

Each unit (processing means) of the network apparatus 1 illustrated in FIG. 3 can be realized by a computer program causing a computer included in the network apparatus 1 to use its hardware and to perform each processing described above.

As described above, the network apparatus 1 according to the present exemplary embodiment marks packets that exceed a predetermined rate limit (see the shaded areas in the left-side graph in FIG. 2). The marked packets are counted by the filter processing unit 30 and visualized by the monitoring unit 40 (see the right-side graph in FIG. 2).

In particular, according to the present exemplary embodiment, since the policing processing unit performs marking (coloring), even when monitoring is performed within a short period, abnormal traffic that appears within a very short period as typified by a micro-bursting can be observed, without increasing load. In addition, since the present exemplary embodiment can be configured by applying a policing processing unit and a filter processing unit that are generally widely used, implementation is also easy.

In the above exemplary embodiment, marking (coloring) processing for rewriting a CoS value in a VLAN tag is used. However, alternatively, a different IP header field may be used. For example, a TOS value in an IP header may be used, and the filter processing unit may be configured to count packets whose TOS value has been rewritten. If such TOS value in an IP header is used, the VLAN header is not necessary.

In addition, in the above exemplary embodiment, the packet processing unit 312 in the filter processing unit 30 converts a marked (colored) packet into its initial state. However, alternatively, the packet processing unit 312 may omit such processing. In such case, the egress processing unit 50 or a node outside the network apparatus 1 can perform priority control based on marking (coloring).

In addition, in the above exemplary embodiment, Leaky Bucket is used as the rate monitoring algorithm used by the policing processing unit 20. However, alternatively, a different algorithm may be used.

Second Exemplary Embodiment

Next, a second exemplary embodiment of the present invention will be described in detail with reference to the drawings. In the second exemplary embodiment, functions are distributed to a plurality of network apparatuses. The following description will be made with a focus on the difference from the above first exemplary embodiment.

Figure 5:
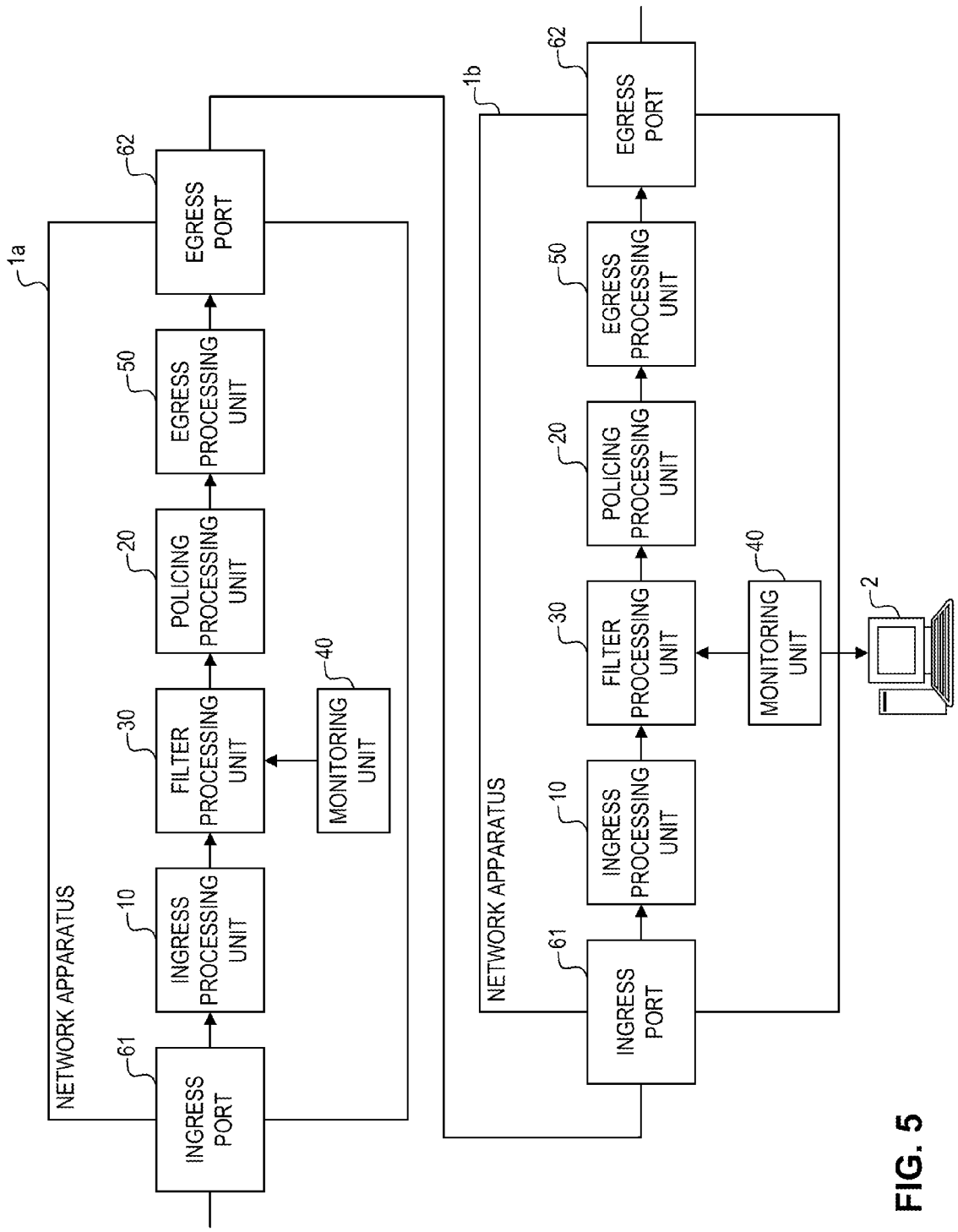
FIG. 5 is a block diagram illustrating a configuration of a network apparatus according to a second exemplary embodiment of the present invention.

FIG. 5 is a block diagram illustrating a configuration of network apparatuses according to the second exemplary embodiment of the present invention. FIG. 5 illustrates a configuration in which network apparatuses 1a and 1b are connected in series with each other.

The network apparatuses 1a and 1b have approximately the same configuration as that of the network apparatus 1. However, the network apparatuses 1a and 1b are different from the network apparatus 1 in that the filter processing unit 30 in each of the network apparatuses 1a and 1b is located upstream of the policing processing unit 20.

The filter processing unit 30 of the upstream network apparatus 1a only forwards packets received via the ingress port 61, without performing any processing on the packets. In addition, the policing processing unit 20 of the downstream network apparatus 1b forwards packets to the egress processing unit 50, without performing any marking (coloring) processing.

The egress processing unit 50 and the egress port 62 of the upstream network apparatus 1a and the ingress port 61 and the ingress processing unit 10 of the network apparatus 1b relay packets outputted from the policing processing unit 20 of the network apparatus 1a to the filter processing unit 30 of the network apparatus 1b.

As is the case of the above monitoring unit 40 according to the first exemplary embodiment, the monitoring unit 40 of the network apparatus 1b reads a counter value of the filter processing unit 30 in a period determined to detect a micro-bursting. In this way, occurrence of a micro-bursting can be detected by the monitoring apparatus 2 connected to the monitoring unit 40.

Thus, the present invention can be realized by using a plurality of network apparatuses. In addition, while packets transmitted from the network apparatus 1b to the network apparatus 1a have not been described, these packets can also be monitored in a similar processing sequence.

While suitable exemplary embodiments of the present invention have thus been described, the present invention is not limited thereto. Further variations, substitutions, or adjustments can be made without departing from the basic technical concept of the present invention. For example, while a configuration in which two network apparatuses are connected in series with each other is illustrated in FIG. 5 to facilitate understanding of the present invention, three or more network apparatuses 1 may be used. Alternatively, another network apparatus may exist between the network apparatuses 1a and 1b.

In addition, the present invention is not limited to the configuration according to the above second exemplary embodiment. Namely, the present invention can be realized by arranging the policing processing unit 20 after the filter processing unit 30. In such case, it is possible to omit the packet counting operation by the filter processing unit 30 of the upstream network apparatus and the marking (coloring) processing by the filter processing unit 30 of the downstream network apparatus.

The disclosure of the above PTL is incorporated herein by reference thereto.

Modifications and adjustments of the exemplary embodiments and examples are possible within the scope of the overall disclosure (including the claims and the drawings) of the present invention and based on the basic technical concept of the present invention. Various combinations and selections of various disclosed elements (including the elements in each of the claims, examples, drawings, etc.) are possible within the scope of the claims and the drawings of the present invention. That is, the present invention of course includes various variations and modifications that could be made by those skilled in the art according to the overall disclosure including the claims and the technical concept.

REFERENCE SIGNS LIST 1, 1A, 1a, 1b, 100 network apparatus
2 monitoring apparatus
10 ingress processing unit
10A receiving unit
20 policing processing unit
20A marking unit
30 filter processing unit
30A measuring unit
40, 40A monitoring unit
50 egress processing unit
50A transmitting unit
61 ingress port
62 egress port
110 upper network apparatus
120 terminal
301 filter condition search unit
302 first filter
303 second filter
311 counter processing unit
312 packet processing unit
320 counter value storage unit

What is claimed is:

1. A network apparatus, comprising:
a memory storing instructions; and
one or more processors configured to execute the instructions to:
mark traffic that exceeds a rate limit;
measure an amount of the marked traffic by using one or more filters to detect information written in a data packet by the one or more processors; and
output the measured traffic amount in a period determined based on an expected time duration of abnormal traffic, the abnormal traffic being a detection target of the network apparatus.

2. The network apparatus according to claim 1, wherein the one or more processors are further configured to execute the instructions to:
rewrite a known value in a packet header field; and
convert the rewritten value into the known value.

3. The network apparatus according to claim 1, wherein the one or more processors are further configured to execute the instructions to generate a notification indicating an occurrence of the abnormal traffic if a difference between a traffic amount at a point in time and a traffic amount at a time prior to the point in time exceeds a threshold.

4. The network apparatus according to claim 1, wherein the abnormal traffic is micro-bursting.

5. The network apparatus according to claim 1, wherein a designated one of the one or more processors performs the measuring and the outputting.

6. A communication system, comprising:
a first network apparatus comprising:
a first memory storing first instructions; and
first one or more processors configured to execute the first instructions to mark traffic that exceeds a rate limit; and
a second network apparatus comprising:
a second memory storing second instructions; and
second one or more processors configured to execute the second instructions to:
measure an amount of the marked traffic by using one or more filters to detect information written in a data packet by the first network apparatus; and
output the measured traffic amount in a period determined based on an expected time duration of abnormal traffic, the abnormal traffic being a detection target of the communication system.

7. An abnormal traffic detection method implemented by an network apparatus including one or more processors, the method comprising steps of:
marking, by the one or more processors, traffic that exceeds a rate limit;
regularly measuring, by the one or more processors, an amount of the marked traffic by using one or more filters to detect information written in a data packet by the one or more processors; and
outputting, by the one or more processors, the measured traffic amount in a period determined based on an expected time duration of the abnormal traffic.

8. The network apparatus according to claim 1, wherein the information written in the data packet by the one or more processors includes at least one of a priority-designation Class of Service (CoS) value in a Virtual Local Area Network (VLAN) tag, or a Type of Service (ToS) value in an Internet Protocol (IP) header.

9. The communication system according to claim 6, wherein the information written in the data packet by the first network apparatus includes at least one of a priority-designation Class of Service (CoS) value in a Virtual Local Area Network (VLAN) tag, or a Type of Service (ToS) value in an Internet Protocol (IP) header.

10. The communication system according to claim 6, wherein:
   the first one or more processors are further configured to execute the first instructions to rewrite a known value in a packet header field; and
   the second one or more processors are further configured to execute the second instructions to convert the rewritten value into the known value.

11. The communication system according to claim 6, wherein the second one or more processors are further configured to execute the second instructions to generate a notification indicating an occurrence of the abnormal traffic if a difference between a traffic amount at a point in time and a traffic amount at a time prior to the point in time exceeds a threshold.

12. The communication system according to claim 6, wherein the abnormal traffic is micro-bursting.

13. The communication system according to claim 6, wherein a designated one of the one or more processors is configured to execute the first instructions to perform the measuring and the outputting.

14. The detection method according to claim 7, wherein the information written in the data packet by the one or more processors includes at least one of a priority-designation Class of Service (CoS) value in a Virtual Local Area Network (VLAN) tag, or a Type of Service (ToS) value in an Internet Protocol (IP) header.

15. The detection method according to claim 7, further comprising:
   rewriting, by the one or more processors, a known value in a packet header field; and
   converting, by the one or more processors, the rewritten value into the known value.

16. The detection method according to claim 7, further comprising generating, by the one or more processors, a notification indicating an occurrence of the abnormal traffic if a difference between a traffic amount at a point in time and a traffic amount at a time prior to the point in time exceeds a threshold.

17. The detection method according to claim 7, wherein the abnormal traffic is micro-bursting.

18. The detection method according to claim 7, wherein a designated one of the one or more processors performs the monitoring and the outputting.

\* \* \* \* \*